United States Patent [19]
Combes

[11] 4,192,483
[45] Mar. 11, 1980

[54] ONE PIECE SEAT RING WITH O-RING SEAL

[75] Inventor: Marvin G. Combes, Castro Valley, Calif.

[73] Assignee: Grove Valve and Regulator Company, Oakland, Calif.

[21] Appl. No.: 971,269

[22] Filed: Dec. 20, 1978

[51] Int. Cl.$^2$ .............................................. F16K 3/16
[52] U.S. Cl. ................................ 251/172; 277/142; 251/DIG. 1
[58] Field of Search ............... 277/12, 138, 165, 142, 277/164, 173; 251/DIG. 1, 172, 174, 328

[56] References Cited
U.S. PATENT DOCUMENTS

| | | | |
|---|---|---|---|
| 2,688,975 | 9/1954 | Born | 251/DIG. 1 |
| 2,810,543 | 10/1957 | Bryant | 251/172 |
| 2,861,771 | 11/1958 | Bryant | 251/172 |
| 2,882,009 | 4/1959 | Bryant | 251/172 |

*Primary Examiner*—Robert S. Ward, Jr.
*Attorney, Agent, or Firm*—Melvin R. Stidham

[57] ABSTRACT

Sealing means for a flat gate valve comprising one-piece seat rings on both sides of the gate. A resilient O-ring is loosely received in an annular groove in the leading face of each seat ring and the leading faces of the seat rings, radially outward of the annular groove are relieved to provide small clearances with the sides of the gate. A series of vent ducts are provided in the seat ring at the bottom thereof from the bottom of the O-ring groove to the valve body space radially outward of the seat ring.

5 Claims, 4 Drawing Figures

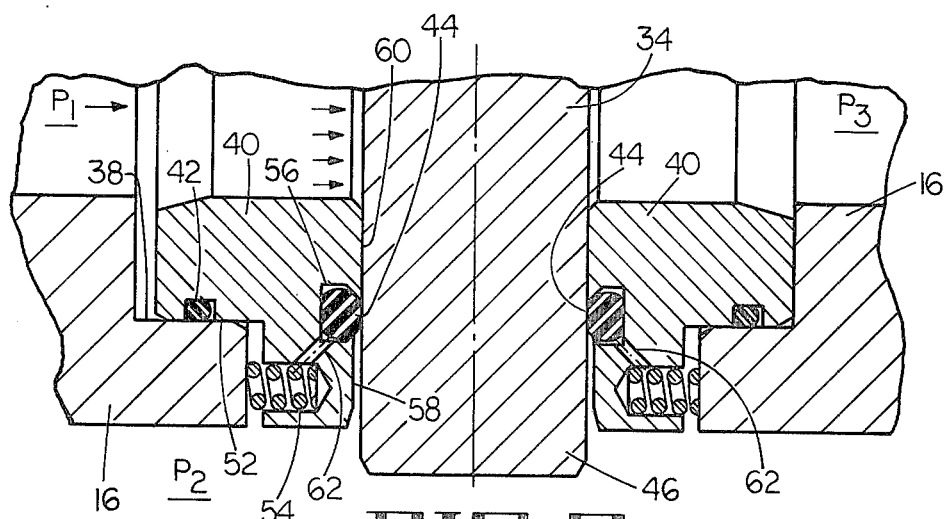
FIG-2-
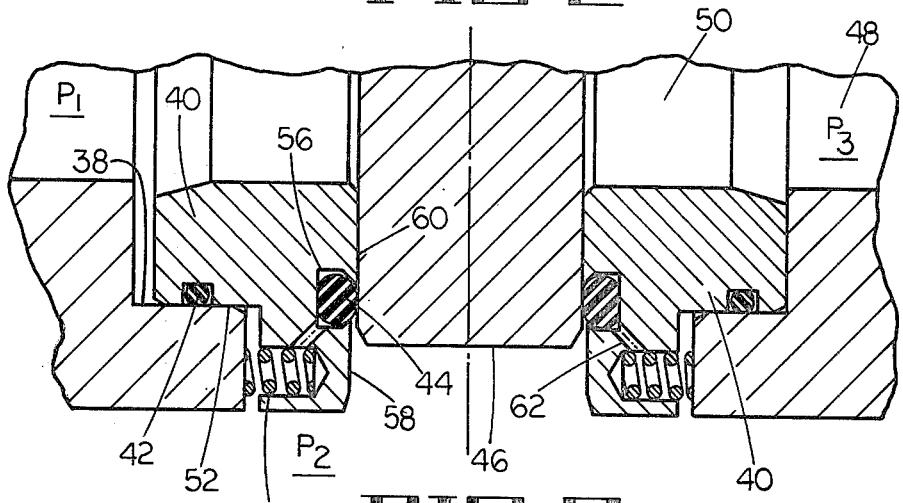
FIG-3-
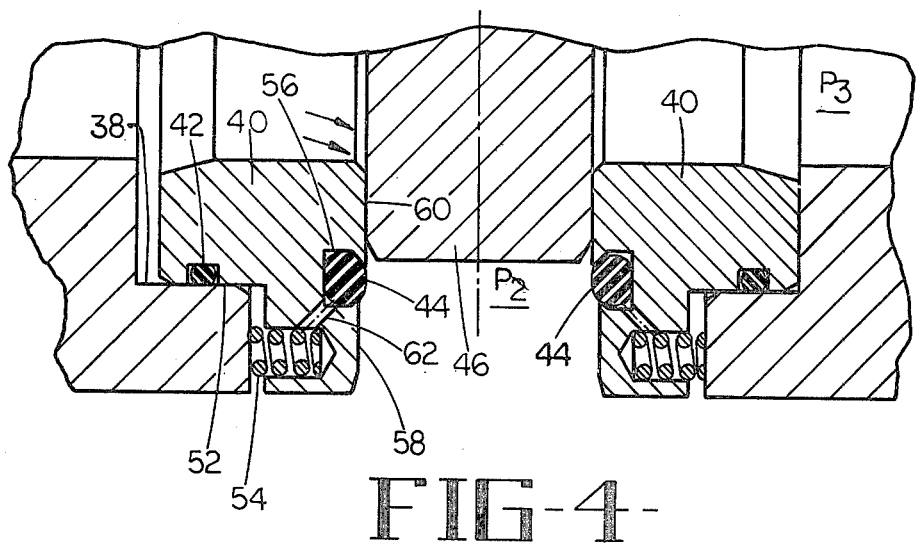
FIG-4-

ONE PIECE SEAT RING WITH O-RING SEAL

BACKGROUND OF THE INVENTION

Elastomeric O-rings are recognized as superior seals and are extremely effective, particularly as static seals, such as in sealing between pipe flanges. Such seals have also proved to be extremely effective as the main seals in valves, but severe problems have been encountered in adapting O-rings for this purpose, particularly in high pressure services. When the valve is initially opened to expose the loosely retained O-ring to a surge of high pressure fluid, there is a tendency to force a segment of the ring from the groove, disrupting the seal and exposing the O-ring to damage.

A pioneer advance in the art that enabled O-rings to function effectively for at least certain types of valves was disclosed in Bryant U.S. Pat. No. 2,713,989. Specifically, in a one-way single seal a vent duct was provided from the bottom of the O-ring groove to the downstream flow passage so that the pressure differential across the seal when it is first exposed to the high pressure fluid is toward the vent, i.e. the bottom of the O-ring recess, to hold the O-ring in place.

Later this sealing principle was applied to gate valves with seals on both sides of the gate, as shown in Bryant U.S. Pat. Nos. 2,810,542 and 2,810,543. In the principal embodiment of the latter each of two seat rings was in two pieces, with a leak path to the flow passage for venting purposes being provided around the inner seat ring component. In addition, vent holes were drilled in the outer ring from the bottom of the O-ring groove to the body space between the upstream and downstream seat rings to provide venting in both directions. Variations of this venting principle are found in other Bryant U.S. Pat. Nos., e.g. 2,861,771, 2,882,009, 2,889,134 and 2,950,897. Subsequent developments established that the principle problem resided in the upstream seal, and that the vent path to the flow passage on the upstream side allowed high pressure fluid to enter the groove behind the O-ring to intensify the problem. Accordingly, for both gate valves and ball valves it was determined that superior O-ring retention was achieved by isolating the O-ring groove from the flow passage, particularly on the upstream side, and venting the groove only to the body space between the upstream and downstream seat rings, which is normally at a pressure lower than the upstream pressure when the valve is closed. This was disclosed in Bryant U.S. Pat. No. 3,109,623, granted Nov. 5, 1963.

Subsequent developments of both gate valve and ball valve products have been directed toward cost-saving features, and it has been determined that considerable savings in labor and machining can be achieved if the seat rings carrying the O-ring seals are made in one piece, rather than inner and outer seat rings which had to be assembled. However, since the clearance between the two seat ring pieces had been used as the vent path from the bottom of the O-ring groove to the surrounding body space, the provision of a one-piece seat required that separate venting ducts be drilled in the seat ring to vent the bottom of the O-ring groove to the body space between the two seat rings. Unless an extremely large number of holes were drilled, particularly in the upstream seat ring, the sudden surge of high pressure fluid on opening still tended to force a portion of the O-ring out of its groove, exposing it to be sliced out when the gate is subsequently lowered.

OBJECTS OF THE INVENTION

It is an object of this invention to provide for a gate valve, a one-piece seat ring with an O-ring seal which is retained in its groove without requiring an excessive number of holes to be drilled from the outer surface of the seat ring to communicate with the O-ring groove.

It is a further object of this invention to provide a one-piece seat ring for a gate valve, which carries an O-ring and which is economical to manufacture and reliable in operation.

Other objects and advantages of this invention will become apparent from the description to follow, particularly when read in conjunction with the accompanying drawings.

SUMMARY OF THE INVENTION

In carrying out this invention, there is provided a valve gate with a flat, parallel sided gate against the opposite sides of which seat rings are urged by spring pressure, augmented by fluid pressure. An O-ring is loosely contained in a groove in and around the forward face of each seat ring, which forward face is relieved radially outward of the groove to provide a small clearance between it and the gate as the radially inward portion of the seat ring carries the load against the gate. By so relieving the outer portion of the leading face, the normal tendency for the O-ring to be blown out of its recess as the valve initially opens is greatly reduced. In addition, small vent ducts are provided from the bottom of the O-ring recess to the body space between the upstream and downstream seals, particularly at the bottom portion of the O-ring, which is the section first exposed when the gate starts to open. This creates a pressure differential across the O-ring from the portion exposed outside of the groove to the bottom of the groove tending to force the O-ring towards the bottom of the groove.

BRIEF DESCRIPTION OF THE DRAWINGS

In the drawings:

FIGS. 2, 3 and 4 are enlarged partial section views of a portion of the sealing means in different stages of valve operation.

DESCRIPTION OF A PREFERRED EMBODIMENT

Figure 1:
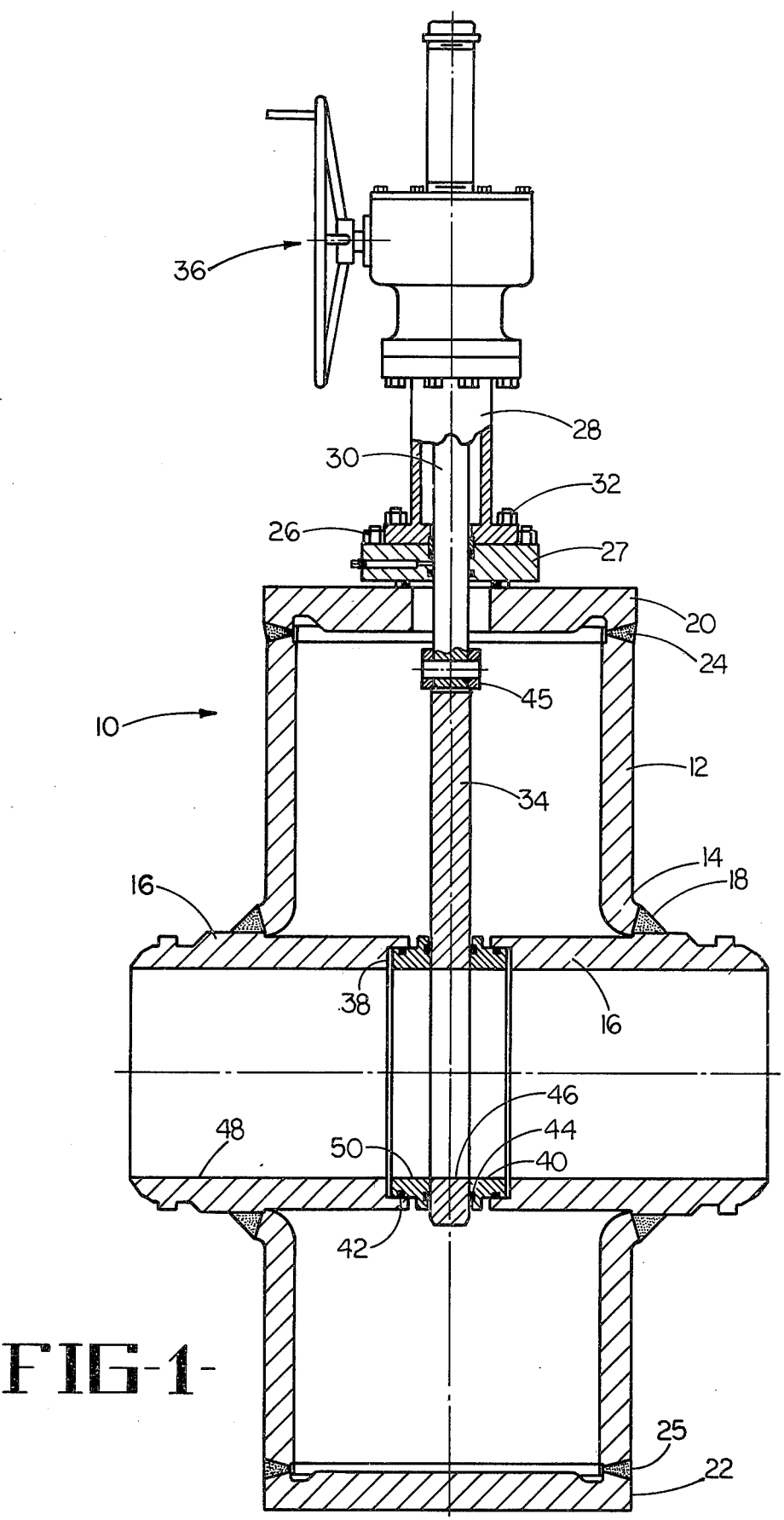
FIG. 1 is a vertical section view of a gate valve embodying features of this invention.

Referring now to FIG. 1 with greater particularity the gate valve 10 of this invention may include a cylindrical valve body 12 having outwardly swaged hub retainers 14 to which cylindrical hubs 16 are welded at 18. The top and bottom closures 20 and 22 may simply comprise thick steel plates welded to the cylindrical body 12 at 24 and 25, respectively. Secured to the top closure 20 by means of bolts 26 is a bonnet plate 27 on which is carried a stem housing 28. The valve stem 30 is slidably received in the bonnet plate 27 and the stem housing base 32 to raise and lower the gate 34 by any suitable means such as a bevel gear operator 36.

The inner ends of the hubs 16 are bored at 38 to receive seat rings 40, which carry suitable sealing means such as O-rings 42 around outer cylindrical surfaces to maintain a seal with hubs 16. Main sealing O-rings 44 are carried in the front faces of the seat rings to seal against the opposite sides of the gate 34.

The gate 34 is mounted on the stem 30 by a coupling 45 which enables limited movement along the axis of the hubs 16, and is preferably of the through-conduit type, having a flow passageway 46 there-through which, when the valve is open, as shown in FIG. 1 is in alignment with flow passages 48 and 50 through the hub and seat rings, respectively.

Referring now to FIGS. 2, 3 and 4, the seat rings 40 are shown in greater detail. There it will be noted that a trailing cylindrical portion 52 of each seat ring is slidable within the bore 38 on the hub 16, with the O-ring 42 providing a seal with the hubs 16 over the full range of sliding movement. The seat rings are urged against the gate by means of springs 54 around the circumference thereof, aided by pressure acting against the back of the seat ring 40. With the valve gate 34 closed as shown in FIG. 2 upstream pressure $P_1$ acting against the gate 34 opposed by the lower downstream pressure $P_3$ forces it downstream, causing the downstream seat ring 40 to be seated against the bottom of its bore 38.

It will be noted that the O-rings 44 are loosely contained within their recesses 56 and that the seal with the gate 34 is maintained by the upstream pressure acting through the elastomer of the O-ring to press it against the gate 34. Then, as the gate raises gradually through the positions shown in FIGS. 3 and 4, there is a sudden surge of high pressure fluid when the valve is initially cracked open, as the top of the gate opening 46 passes the bottom part of the O-ring. This tends to force the portion of the O-ring at the bottom, out of the recess 56. If this occurs, a subsequent closing of the gate tends to shear off that section of the O-ring, rendering it totally ineffective and destroying the seal.

It has been determined that, when finishing the seat ring 40, if that portion 58 of the seat ring radially outward of the recess 56 is cut slightly deeper to relieve it so that the load against the gate is carried by the radially inner portion 60, leaving a small clearance of perhaps less than 1/100th of an inch, this tendency to blow the O-ring section from the recess is greatly alleviated.

Further to assist in O-ring retention, a number of small vent ducts 62 are drilled from the bottom of the O-ring recess 56 to open outward of the seat ring 40, so that this corner of the recess is vented to the pressure $P_2$ in the body space between the upstream and downstream seals 44. This pressure is normally at a pressure lower than the upstream pressure $P_1$ and hence, there is a pressure drop across the upstream O-ring seal 44 from the portion exposed through the groove 56 toward the corner from which the vent ducts 62 open, tending to force the O-ring toward the bottom of the recess. These vent ducts 62 may be provided around the seat rings 40, but are particularly functional at the bottom of the seat ring where the port 46 of the gate first exposes the O-rings 44 to high pressure flow.

While this invention has been described in conjunction with a preferred embodiment thereof, it is obvious that modifications and changes therein may be made by those skilled in the art without departing from the spirit and scope of this invention, as defined by the claims appended hereto.

What is claimed as invention is:

1. For use in a gate valve including a body with aligned flow passages, a flat, parallel sided gate and means for moving said gate between open and closed positions relative to said flow passages;
   a main seal assembly comprising:
   a one-piece seat ring carried in said body upstream of said gate;
   means biasing said seat ring against the upstream side of said gate;
   an annular groove in the leading face of said seat ring; and
   a resilient O-ring loosely received in said groove;
   said leading face of the seat ring being relieved over the full area radially outward of said annular groove to provide a small clearance with the upstream side of the gate.

2. The sealing means defined by claim 1 including:
   a second one-piece seat ring carried in said body;
   means biasing said second seat ring against the downstream side of said gate;
   an annular groove in the leading face of said second seat ring; and
   a resilient O-ring loosely received in said groove;
   said leading face of the second seal ring being relieved over the full area radially outward of each annular groove to provide a small clearance with the downstream side of the gate.

3. The seal means defined by claim 2 wherein:
   the leading faces of said seat rings radially outward of said annular grooves are in planes parallel to but stepped back from the leading faces thereof radially inward of said annular grooves.

4. The seal means defined by claim 2 including:
   at least one duct from each of said annular grooves near the bottoms thereof to a radially outer surface of said seat ring.

5. The seal means defined by claim 4 wherein:
   said duct is situated at the location around said seat ring wherein the O-ring is first uncovered during opening movement of the gate.

* * * * *